United States Patent
Mahankali et al.

(10) Patent No.: US 11,394,775 B2
(45) Date of Patent: Jul. 19, 2022

(54) MECHANISM FOR FACILITATING DYNAMIC STORAGE MANAGEMENT FOR MOBILE COMPUTING DEVICES

(71) Applicant: Intel Corporation, Santa Clara, CA (US)

(72) Inventors: Sridhar Mahankali, Beaverton, OR (US); Suhail Ahmed, Beaverton, OR (US); Rita H. Wouhaybi, Portland, OR (US); Brian D. Brougham, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/129,927

(22) PCT Filed: Sep. 4, 2013

(86) PCT No.: PCT/US2013/058023
§ 371 (c)(1),
(2) Date: Dec. 27, 2013

(87) PCT Pub. No.: WO2015/034483
PCT Pub. Date: Mar. 12, 2015

(65) Prior Publication Data
US 2016/0226972 A1    Aug. 4, 2016

(51) Int. Cl.
*H04L 67/1097* (2022.01)
*G06F 3/06* (2006.01)
(Continued)

(52) U.S. Cl.
CPC ........ *H04L 67/1097* (2013.01); *G06F 3/0605* (2013.01); *G06F 3/067* (2013.01);
(Continued)

(58) Field of Classification Search
CPC combination set(s) only.
See application file for complete search history.

(56) References Cited

U.S. PATENT DOCUMENTS 9,414,222 B1 * 8/2016 Dixon .................. H04L 67/325
2004/0117441 A1    6/2004 Liu et al.
(Continued)

OTHER PUBLICATIONS

PCT/US2013/058023 "Notification of Transmittal of the International Search Report and the Written Opinion of the International Searching Authority, or the Declaration" dated Jun. 3, 2014, 11 pages.
(Continued)

*Primary Examiner* — Caroline H Jahnige
(74) *Attorney, Agent, or Firm* — Hanley, Flight and Zimmerman, LLC

(57) ABSTRACT

A mechanism is described for facilitating dynamic storage management for computing mobile devices according to one embodiment. A method of embodiments, as described herein, includes detecting context-aware data relating to a computing device and a user associated with the computing device, monitoring available space at a local storage of the computing device, and dynamically allocating portions of the space at the local storage based on the context-aware data and results of the monitoring of the space. The dynamic allocation may include providing a first portion of the space to a first content by moving a second content from the local storage to one or more remote storage devices.

20 Claims, 4 Drawing Sheets

(51) Int. Cl.

| | | |
|---|---|---|
| *G06F 13/14* | (2006.01) | |
| *G06F 12/02* | (2006.01) | |
| *H04W 4/80* | (2018.01) | |
| *G06F 16/188* | (2019.01) | |
| *G06F 16/11* | (2019.01) | |
| *G06F 16/13* | (2019.01) | |
| *H04M 1/72454* | (2021.01) | |
| *H04L 67/50* | (2022.01) | |
| *H04W 8/18* | (2009.01) | |

(52) U.S. Cl.
CPC .......... *G06F 3/0608* (2013.01); *G06F 3/0631* (2013.01); *G06F 3/0647* (2013.01); *G06F 3/0653* (2013.01); *G06F 12/0238* (2013.01); *G06F 13/14* (2013.01); *G06F 16/122* (2019.01); *G06F 16/13* (2019.01); *G06F 16/188* (2019.01); *H04L 67/22* (2013.01); *H04M 1/72454* (2021.01); *H04W 4/80* (2018.02); *H04W 8/18* (2013.01); *G06F 2212/1044* (2013.01); *G06F 2212/154* (2013.01); *G06F 2212/171* (2013.01); *G06F 2212/7202* (2013.01); *G06F 2212/7204* (2013.01)

(56) References Cited

U.S. PATENT DOCUMENTS

| | | | |
|---|---|---|---|
| 2004/0158659 A1 | 8/2004 | Yamamoto | |
| 2005/0193414 A1* | 9/2005 | Horvitz | H04N 21/482 |
| | | | 725/46 |
| 2008/0005695 A1* | 1/2008 | Ozzie | G06F 16/9535 |
| | | | 715/811 |
| 2008/0005736 A1* | 1/2008 | Apacible | G06F 9/4843 |
| | | | 718/100 |
| 2008/0091613 A1 | 4/2008 | Gates et al. | |
| 2011/0010518 A1 | 1/2011 | Kavuri | |
| 2012/0131125 A1* | 5/2012 | Seidel | H04N 5/76 |
| | | | 709/212 |
| 2012/0141092 A1* | 6/2012 | Friedman | H04N 9/8042 |
| | | | 386/248 |
| 2012/0221683 A1 | 8/2012 | Ferris | |
| 2012/0290916 A1 | 11/2012 | Parekh et al. | |
| 2013/0029652 A1* | 1/2013 | Nakrani | H04L 67/1097 |
| | | | 455/418 |
| 2013/0110967 A1 | 5/2013 | Ueoka | |
| 2013/0218838 A1* | 8/2013 | Bevan | G06N 7/005 |
| | | | 707/626 |
| 2013/0227236 A1 | 8/2013 | Flynn et al. | |
| 2014/0179272 A1* | 6/2014 | Zhang | H04W 4/001 |
| | | | 455/411 |
| 2014/0379837 A1* | 12/2014 | Gasser | H04L 67/2847 |
| | | | 709/213 |
| 2015/0026415 A1* | 1/2015 | Clausen | G06F 12/0862 |
| | | | 711/137 |

OTHER PUBLICATIONS

European Application No. 13893126.6, European Search Report, dated Jun. 22, 2107, 9 pgs.

European Patent Office, "Decision to Refuse a European Patent Application," dated Dec. 21, 2020 in connection with European Patent Application No. 13893126.6, 19 pages.

China National Intellectual Property Administration, "First Office Action," dated Dec. 1, 2017 in connection with Chinese Patent Application No. 201380078731.1, 5 pages.

Japanese Patent Office, "Non Final Notice of Reasons for Rejection," dated Mar. 14, 2017 in connection with Japanese Patent Application No. 2016-540856, 1 page.

European Patent Office, "Summons to Attend Oral Proceedings," issued Mar. 27, 2020 in connection with European Patent Application No. 13893126.6, 11 pages.

European Patent Office, "Summons to Attend Oral Proceedings," issued May 28, 2020 in connection with European Patent Application No. 13893126.6, 14 pages.

European Patent Office EPC for Application No. 13893126.6 dated Jul. 24, 2019, 6 pages.

* cited by examiner

MECHANISM FOR FACILITATING DYNAMIC STORAGE MANAGEMENT FOR MOBILE COMPUTING DEVICES

CROSS-REFERENCE TO RELATED APPLICATION

This patent application is a U.S. National Phase Application under 35 U.S.C. § 371 of International Application No. PCT/US2013/058023, filed Sep. 4, 2013, entitled MECHANISM FOR FACILITATING DYNAMIC STORAGE MANAGEMENT FOR MOBILE COMPUTING DEVICES by Sridhar Mahankali, et al., the benefit and priority are claimed thereof and the entire contents of which are incorporated herein by reference.

FIELD

Embodiments described herein generally relate to computer programming More particularly, embodiments relate to a mechanism for facilitating dynamic storage management for mobile computing devices.

BACKGROUND

Despite the advancement in technology for computing device (e.g., mobile computing devices) and even with the introduction of cloud computing, management of storage remains a manual process with most computing devices, particularly mobile devices. Mobile devices, by design, have smaller storage space and although most users would prefer having the cloud storage carry most of the content, they lose any access to the cloud-stored content immediately upon losing the connection (such as when a smartphone is put in airplane mode or is in a crowded area, etc.). This is because today's storage management techniques are static and they lack intelligence and efficiency.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

In the following description, numerous specific details are set forth. However, embodiments, as described herein, may be practiced without these specific details. In other instances, well-known circuits, structures and techniques have not been shown in details in order not to obscure the understanding of this description.

Embodiments provide for a dynamic and efficient management of storage at computing devices (e.g., mobile computing devices, such as smartphone, tablet computers, etc.) based on any number of factors, such as total local storage space, available local storage space, and various context vectors, such as a user's current and previous interaction with a computing device, location, time of day, day of week, the user's activities, etc. Further, using the factors above, embodiments provide for dynamic augmenting with an elastic amount and type of storage in the cloud that may be specific to the computing device, one or more applications, a particular context, a service, etc. Embodiments further provide a dynamic and context-aware manner of updating the user's applications and other content (e.g., photos, music, etc.) residing locally on the user's mobile device to facilitate optimized usage of the limited local storage on the mobile device.

For example and in one embodiment, various context-aware, location-aware, predictability, connectivity, proximity, and location management techniques (e.g., Intel®'s Common Connectivity Framework (CCF), Bluetooth, Bluetooth low energy (BLE) or Bluetooth Smart, WiFi proximity, Radio Frequency Identification (RFID), geo-fencing, Location-Based Service (LBS), Virtual Private Network (VPN), etc.) may be used and applied as appropriate and based on, for example, user and/or device activities and behavior, history of user and/or device activities and behavior, nature and frequency of a change in activity/behavior, type of device (e.g., a smartphone versus a dumb phone, a desktop computer versus a laptop computer, etc.), proximity/distance between devices, (e.g., a few feet versus several thousand miles, etc.), etc. It is to be noted that embodiments are not limited to any particular technique or solution. It is to be further noted that the use of certain names or terms, such as "Common Connectivity Framework", "CCF", "Bluetooth", etc., should not be read to limit embodiments to software or devices that carry that label in products or in literature external to this document.

Figure 1:
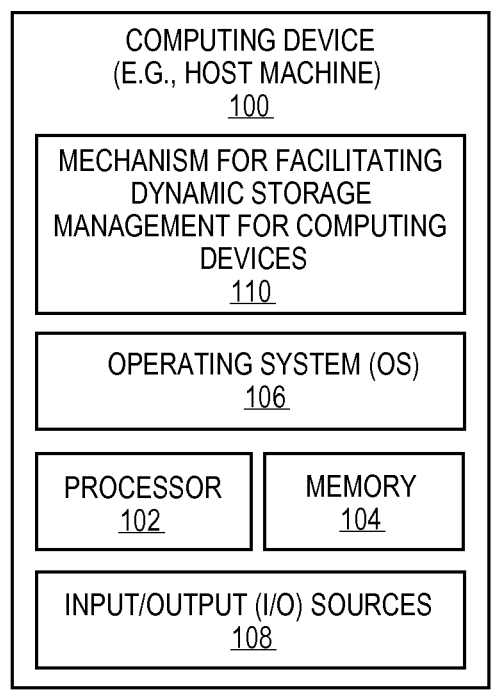
FIG. 1 illustrates a mechanism for facilitating dynamic storage management for computing devices employed at a computing device according to one embodiment.

FIG. 1 illustrates a mechanism for facilitating dynamic storage management for computing devices 110 employed at a computing device 100 according to one embodiment. Computing device 100 serves as a host machine for facilitating dynamic storage management for computing devices ("storage management mechanism"). Computing device 100 may include mobile computing devices, such as cellular phones including smartphones (e.g., iPhone® by Apple®, BlackBerry® by Research in Motion®, etc.), personal digital assistants (PDAs), tablet computers (e.g., iPad® by Apple®, Galaxy 3® by Samsung®, etc.), laptop computers (e.g., notebook, netbook, Ultrabook™, etc.), e-readers (e.g., Kindle® by Amazon®, Nook® by Barnes and Nobles®, etc.), etc. Computing device 100 may further include set-top boxes (e.g., Internet-based cable television set-top boxes, etc.), and larger computing devices, such as desktop computers, server computers, etc.

Computing device 100 includes an operating system (OS) 106 serving as an interface between any hardware or physical resources of the computer device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "computing device", "node", "computing node", "host", "server", "memory server", "machine", "device", "computing device", "computer", "computing system", and the like, may be used interchangeably throughout this document.

Figure 2:
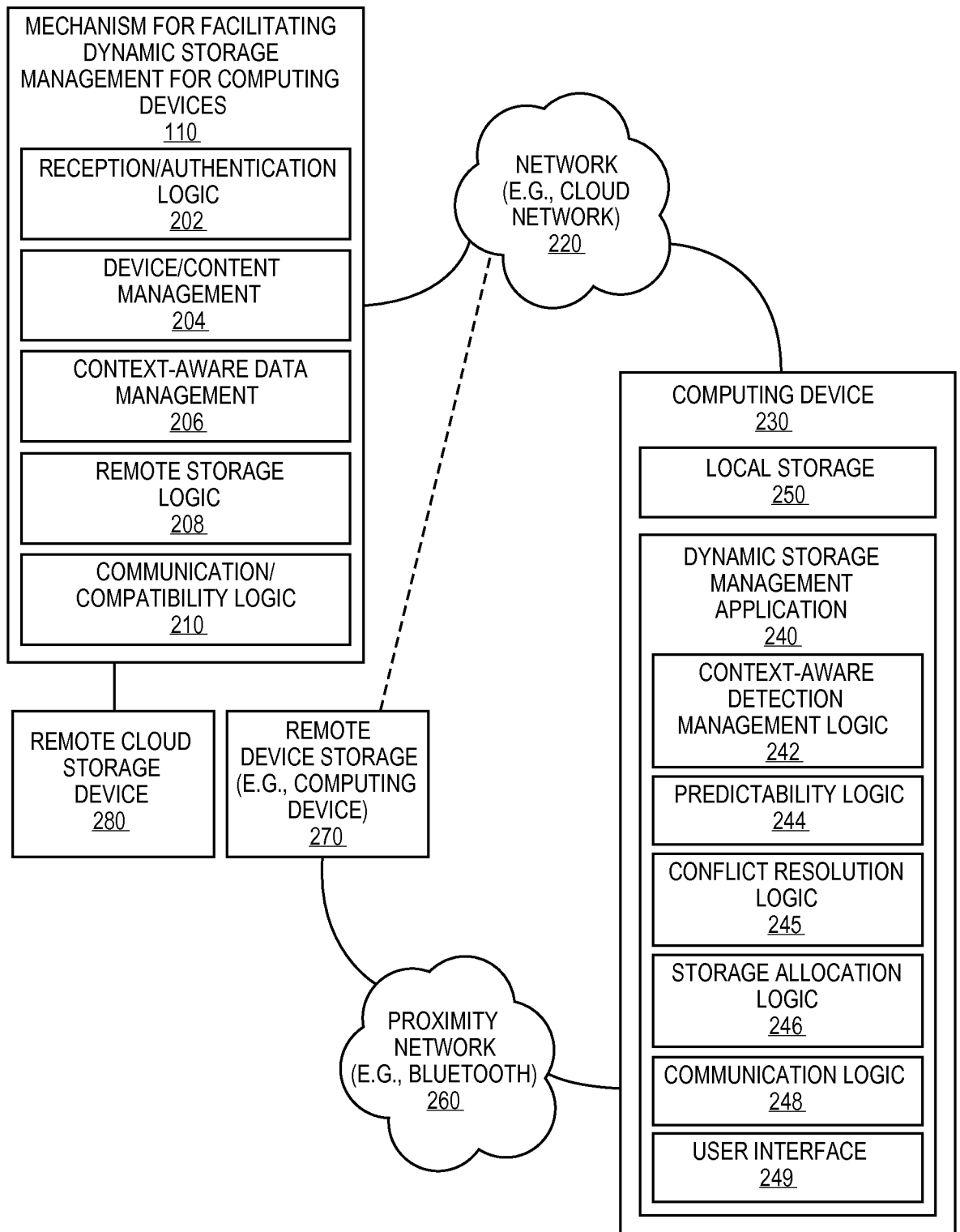
FIG. 2 illustrates a mechanism for facilitating dynamic storage management for computing devices according to one embodiment.

FIG. 2 illustrates a mechanism for facilitating dynamic storage management for computing devices 110 according to one embodiment. In one embodiment, storage management mechanism 110 includes a number of components, such as reception/authentication logic 202, context-aware data management logic 204, remote storage logic 208, and communication/compatibility logic 210. Storage management mechanism 110 may be hosted by a host machine, such as computing device 100 of FIG. 1, and be in communication with one or more storage devices, such as remote storage device 280, and one or more computing devices, such as computing device 230 (e.g., mobile computing device, such as a smartphone, a tablet computer, etc.), over one or more networks, such as network 220 (e.g., cloud network, the Internet, etc.).

Computing device 230 may employ a dynamic storage management application 240 having one or more components, such as context-aware detection and management logic 242, predictability logic 244, conflict resolution logic 245, storage allocation logic 246, communication logic 248, and user interface 249. Computing device 230 may include local storage 250 and have access to one or more remote storage devices, such as remote device storage 270, over one or more networks, such as proximity network (e.g., Bluetooth, BLE or Bluetooth Smart, WiFi proximity, RFID, etc.) and/or network 220, etc. Computing device 230 may also have access to other remote storage devices, such as remote cloud storage 280, over network 220 and via storage management mechanism 110. In one embodiment, remote device storage 270 may include a standalone storage device or be part of another computing device, such as a desktop computer, a laptop computer, a tablet computer, a smartphone, etc., which may belong to the user of computing device 230. It is contemplated that in some embodiments, any number and type of cloud-based remote storages may be employed and placed in communication, directly or indirectly, with computing device 230 and that embodiments are not limited to the illustrated single remote cloud storage device 280. Similarly, any number and type of device-based storage devices, such as remote device storage 270, and computing devices, such as computing device 230, may be employed and placed in communication with each other.

In one embodiment, reception/authentication logic 202 may receive a request from computing device 230 for the use of remote storage 280 and other tasks capable of being performed by various components 204-210 of storage management mechanism 110. Upon receiving the request, computing device 230 and/or its user are authenticated by reception/authentication logic 202 using any number and type of authentication techniques and data, such as user identification (userID), password, secret questions, public/private keys, encryption, internet protocols (IP) addresses, etc. Once the authentication process is completed, storage management mechanism 110 and storage management application 240 may be put into communication and synchronization, using any number and type of synchronization techniques. In some embodiments, computing device 230 may be in direct communication with remote cloud storage 280 and/or remote device storage 270 (via, for example, Internet Protocol (IP) communications) to directly communicate data between computing device 230 and remote storages 270, 280.

Computing device 230 may include a smartphone having any number and type of applications (e.g., news applications, social networking applications, games, etc.) and other content (e.g., photographs, videos, music, etc.) stored at local storage 250. It is contemplated that the limited amount of local storage 250 may not be sufficient to hold all that content without the user to compromise on some of that content (e.g. delete photos, music, applications, etc.) to make space at local storage 250. In some embodiments, the user of computing device 230 may choose to back up any amount and type of content to remote cloud storage 280 over network 220. This may be accomplished by, for example, directing a request from storage allocation logic 246 of storage management application 240 to reception/authentication logic 202 of storage management logic 202. However, as previously mentioned, computing device 230 may communicate directly with remote storages 270, 280 and further, computing device 230 may leverage a different authentication mechanism for each type of remote storage 270, 280. Upon approval and proper authorization, the request may then be forwarded on to remote storage logic 208 which import the specified content from local storage 250, over network 220, and forwards it on to be stored at remote cloud storage 280.

The backed up content may then be managed by device/content management logic 204. For example, device/content management logic 204 may manage and keep track of various devices, including computing device 230, in communication with storage management mechanism 110 and their respective contents stored at remote cloud storage 280. Similarly, context-aware data management logic 206 may manage and keep track of context-aware data relating to the devices, their users, and the backed up contents. For example, upon completing or as part of the transaction of backing up of selective content at remote cloud storage 280, in one embodiment, storage management mechanism 110 and storage management application 240 may then be synchronized so that any data, such as context-aware data, relevant to the content backed up at remote cloud storage 280 may also be received and managed, via context-aware data management logic 206, at storage management mechanism 110.

In one embodiment, context-aware detection and management logic (context-aware logic) 242 may be used to detect and define the context of the device usage of computing device 230. For example, context may be derived or defined based on any number of factors, such as user-defined set of contexts (e.g., no use for Facebook® application on Monday-Friday from 9 AM-5 PM, photo/video file editing Sunday nights, etc.), automatically detected set of contexts (e.g., decreasing phone activity after 10 PM on weekdays and midnight on weekends, increased reading activity during evening, etc.) as detected by context-aware logic 242, increased use of ebook application (e.g., iBook, Kindle®, etc.) after arriving at an airport, etc. It is contemplated that contexts may be associated with any number and type of user and/or device activities that may be range from being permanent to habitual to frequent to occasional, etc.

Moreover, since the nature of file movement and management may logically include some time-consuming operations (e.g., communication, such copying back and forth, of data, etc.), predictability logic 244 may be used to predict the context before it happens so that some of the time-consuming tasks may be efficiently and predictability performed beforehand. For example, when at an airport before boarding a flight or even as the user heads towards the airport (e.g., as predicted/determined via the GPS route, calendar entry, routine travels, etc.), it may be predicted that the user is likely to lose connection in a short period of time and thus certain time-consuming tasks (e.g., retrieving e-library for reading books during flight, etc.) may be performed prior to the user losing the connection. In one embodiment, predictability logic 244 may keep track of each context and its frequency and using this information and other relevant data, predictability logic 244 may predict the user/device behavior. The user/device behavior prediction by predictability logic 244 may then be used by storage allocation logic 246 to allocate or request the allocation of the storage space, accordingly. For example, as defined by the user (and inputted via user interface 249) or as detected and derived by context-aware logic 242, the user is known to access news and/or work-related applications during work hours on weekdays, but not any of the social networking applications or games during those hours. Similarly, again, as defined by the user (and inputted via user interface 249) or as detected and derived by context-aware logic 242, the user is known to access various social networking applications and games in the evening (such as when at home with family), but not any of the news and/or work-related applications.

In one embodiment, if this behavior or preference information is not provided by the user, context-aware logic 242 may adaptively learn the user's behavior and the corresponding usage of computing device 230 which is then used by predictability logic 244 to predict the device usage to facilitate storage allocation logic 246 to allocate the storage, accordingly. For example, during the work hours, social networking applications and games may be moved to remote device storage 270, over proximity network 260, or backed up to remote cloud storage 280, over network 220. Similarly, during evening hours, social network applications and games may be stored at local storage 250, where news and work-related applications may be move to remote device storage 270 and/or remote cloud storage 280.

This pattern and predictability may continue until the user changes the preferences, such as explicitly by overwriting an assumption or pattern, or a change in user/device behavior is detected and defined as a change by context-aware logic 242. For example, the user may habitually go to sleep at 10 PM every weeknight (e.g., computing device 230 is turned off) or regularly attend a business meeting at 10 AM every weekday (e.g., computing device 230 is placed in airplane mode), but even these reliably predictable patterns can change if, for example, the user goes on vacation, falls ill, changes jobs, etc. Some of the changes, such as going on vacation or falling ill, etc., may be temporary, causing temporary modifications to storage allocation (e.g., on vacation, the user may want to have an all-day access to social networking applications, etc.), but certain other changes may be longer-lasting, such as changing jobs. For example, at the new job, the user may attend regular meetings at 2 PM, instead of 10 AM, and this change in behavior may either be provided by the user, via user interface 249, or detected by context-aware logic 242, interpreted overtime and subsequently, predicted by predictability logic 244, and then used by storage allocation logic 246 to appropriately allocate the storage to various applications and contents of computing device 230. Further, for example, the user may use user interface 249 to change several settings at once, for example, when the user is on vacation, even during normal work hours, the context could be similar to weekends and the behavior could cluster accordingly, allowing the user to change the context and affect several policies at once.

In some embodiments, any conflict between two or more applications, such as two different applications competing for space to be accessed and used on computing device 230 may be reported to and resolved by conflict resolution logic 245. In one embodiment, the user may choose to define and provide a conflict resolution policy, via user interface 249, which is then stored at local storage 250 and managed by context-aware logic 240 to all future conflict resolutions. The user may define the conflict resolution policy as "family time is above work", so no work-related activities (such as work emails) to be received or performed during family time, etc., but "work is above regular casual/play time", so interrupt gaming for work-related phone calls, notifications, emails, etc. For example, if there is a conflict where the user's company-based application (e.g., email) is attempting to download a number of emails locally at local storage 250 at the same time the user is listening to music where the music application having cached a number of songs at local storage 250, using the conflict resolution policy, if the user is listening to the music during "family time", the emails would have to wait for the family time to be over, but if it is "casual/play time", the emails may interrupt the music until they are downloaded.

In another embodiment, in the absence of a user-defined conflict resolution policy, conflict resolution logic 245 may use other factors, such as the type of content in conflict, user's location, or even user feedback, etc., to serve as the tie-breaker. For example, by default, work takes priority over music, so, using the example above, the emails may be allowed to be downloaded. Further, conflict resolution logic 245 may automatically and dynamically make certain adjustments based on other factors, such as the user's location, time of the day, etc. For example, during family time or when the user is on vacation, conflict resolution logic 245 may allow a number of songs (e.g., 5 songs, 10 songs, etc.) to be cached before requesting storage allocation logic 246 to allocate local storage to the downloading of work emails. Further, conflict resolution logic 245 may automatically and dynamically assign the highest priority or tie-breaker to certain emergency or very important applications/contents, such as hospital, police, fire, child's school, etc.

In one embodiment, the use of the limited space offered by location storage 250 is fully optimized by dynamically and intelligently moving, temporarily, certain applications or contents to one or more of any number and type of remote storage devices, such as remote device storage 270 and/or remote cloud storage 280, to free up local storage at local storage 250 for other applications based on context-aware data, conflict resolution policies, etc. It is contemplated that access to remote storages 270, 280 may be assigned or obtained based on (1) content or applications (e.g., news content (e.g., NY Times, Wall Street Journal, etc.) is downloaded at local storage 250 on weekdays at 5 AM, based on usage, but then it is automatically deleted once the user has read it or when the user gets to the office or at a particular time of day (e.g., 11 AM), etc.; (2) context (e.g., storage priority may be dynamically changed with the user's movement, such as the priority remote storage may be switched to a storage associated with an enterprise server when the user is on school campus, to remote device storage 270 when the user in a shuttle bus, to work server for work-related applications and contents when at work, etc.; and (3) per service (e.g., get news, email, etc., from Yahoo® irrespective of which application uses it, etc.), etc.

In one embodiment, communication logic 248 may be used to facilitate connection or communication between computing device 230 and storage management mechanism 100, remote device storage 270, and any number and type of other computing devices, applications, databases, remote storage devices, etc. In one embodiment, device/content management 204 and context-aware data management 206 may serve to manage context-aware data, conflict resolution data, and other relevant data (such as any data relating to computing device 230 and its user), etc., and may assist storage management application 240 and/or directly participate in various processes, such as managing and allocating storage, resolving conflict, interpreting behavior and contexts, facilitating communication, etc.

Communication/compatibility logic 210 may be used to facilitate dynamic communication and compatibility between various computing device, such as host machine 100 of FIG. 1, computing device 230 (e.g., mobile computing device), etc., databases and storage devices, such as remote cloud storage 280 and remote device storage 270, networks, such as network 220 (e.g., cloud network, the Internet etc.) and proximity network 260 (Bluetooth, BLE, WiFi proximity, etc.), etc., software applications/websites, (e.g., social networking websites, such as Facebook®, LinkedIn®, Google+®, etc., business applications, games and other entertainment applications, etc.), programming languages, etc., while ensuring compatibility with changing technologies, parameters, protocols, standards, etc.

It is contemplated that any number and type of components may be added to and/or removed from storage management mechanism 110 and storage management application 240 to facilitate various embodiments including adding, removing, and/or enhancing certain features. For brevity, clarity, and ease of understanding of storage management mechanism 110 and storage management application 240, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

Figure 3:
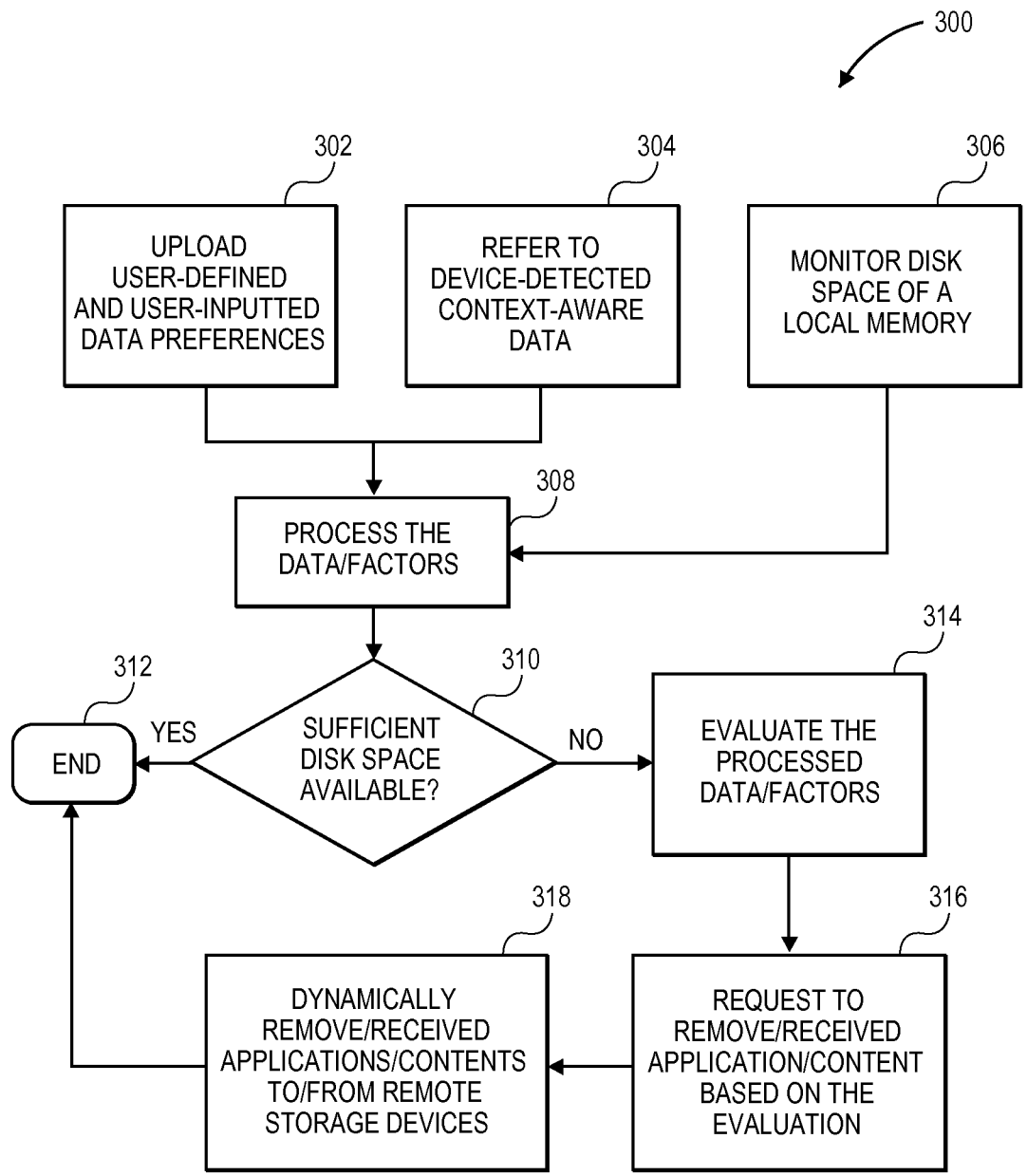
FIG. 3 illustrates a method for facilitating dynamic storage management for computing devices according to one embodiment.

FIG. 3 illustrates a method 300 for facilitating dynamic storage management for computing devices according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by storage management mechanism 110 and/or storage management application 240 of FIG. 2.

Method 300 may begin at any one or more of blocks 302, 304 and 306. For example, user-defined and user-inputted data preferences (e.g., contexts, application priorities, conflict policies, etc.) are uploaded to a computing device (e.g., client computing device, such as a mobile computing device) at block 302. At block 304, refer to device-detected context-aware data (e.g., learned contexts, usage behavior, user profile, policies, prioritizations, etc.). At block 306, monitor the disk space of a local storage of the computing device. At block 308, process the data/factors, such as the user-provided preferences, the disk-detected context-aware data, and the data relating to monitored local disk space to determine current and future storage allocation for other applications and/or contents.

At block 310, a determination is made as to whether there is sufficiently available disk space at the local storage to accommodate the current and/or future storage allocation for other applications and/or contents that are being requested by the user to be accessed at the computing device. If there is sufficient amount of disk space available, the process ends at block 312. If not, at block 314, the processed factors (e.g., the user-provided preferences, the disk-detected context-aware data, and the monitored local disk space) are evaluated (e.g., certain factors are assigned a higher weight than other factors, such as work-related applications/contents weigh higher during work hours, etc.) so that appropriate and efficient storage allocation may be achieved. At block 316, based on the evaluation, one or more applications and/or certain content are chosen/selected and requested to be removed to and/or received from one or more remote storage devices, such as a cloud-based remove storage device associated with a server computer over a cloud network and/or a device-based storage device associated with another computing device (e.g., mobile computing device) over a proximity network, etc. At block 318, the selected applications/content are removed to and/or received from the one or more remote storage devices. The process ends at block 312.

Figure 4:
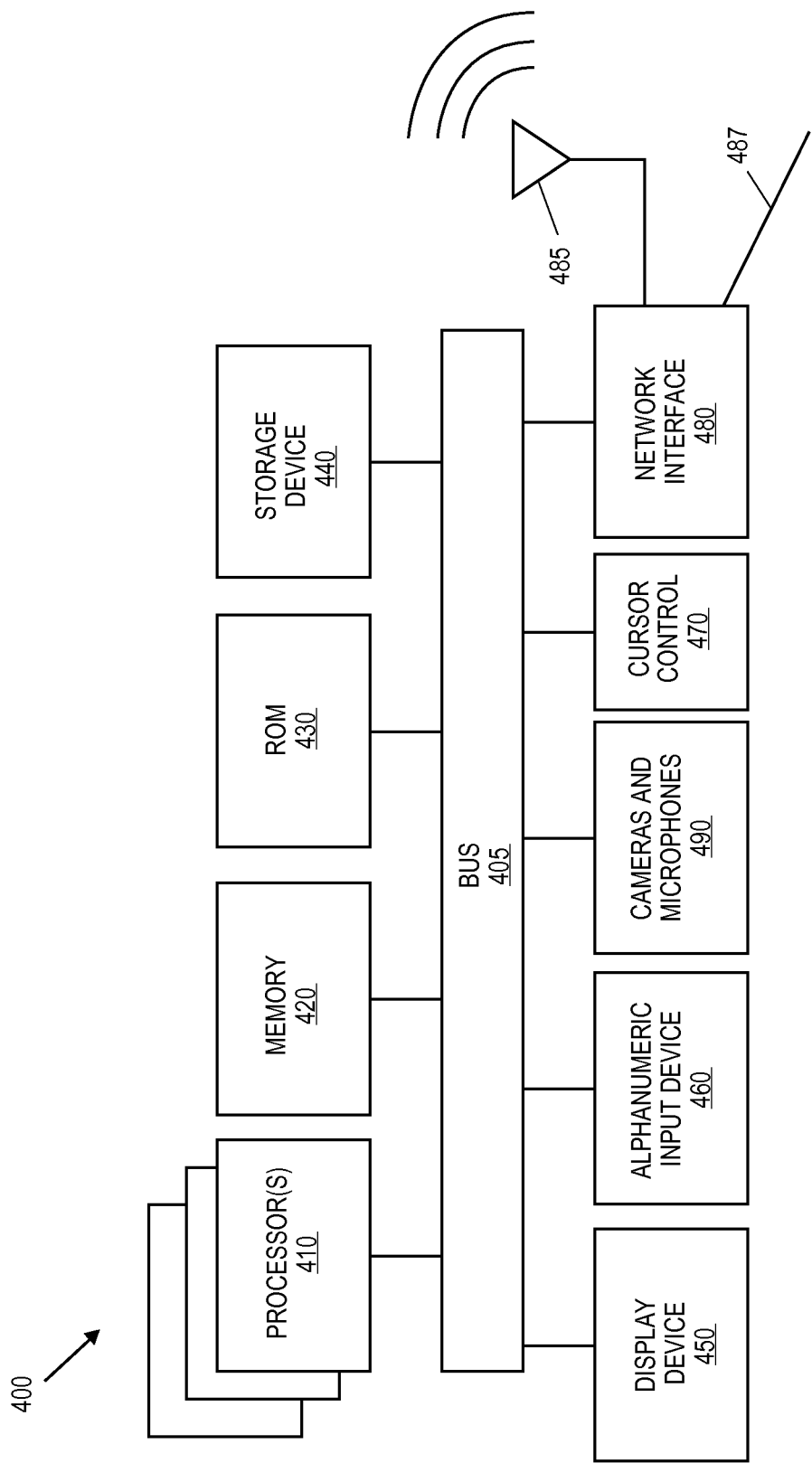
FIG. 4 illustrates computer system suitable for implementing embodiments of the present disclosure according to one embodiment.

FIG. 4 illustrates an embodiment of a computing system 400. Computing system 400 represents a range of computing and electronic devices (wired or wireless) including, for example, desktop computing systems, laptop computing systems, cellular telephones, personal digital assistants (PDAs) including cellular-enabled PDAs, set top boxes, smartphones, tablets, etc. Alternate computing systems may include more, fewer and/or different components. Computing device 400 may be the same as or similar to or include host machine 100, employing storage management mechanism 110, of FIG. 1 and/or client computing device 250, employing storage management application 240, of FIG. 2.

Computing system 400 includes bus 405 (or a link, an interconnect, or another type of communication device or interface to communicate information) and processor 410 coupled to bus 405 that may process information. While computing system 400 is illustrated with a single processor, electronic system 400 and may include multiple processors and/or co-processors, such as one or more of central processors, graphics processors, and physics processors, etc. Computing system 400 may further include random access memory (RAM) or other dynamic storage device 420 (referred to as main memory), coupled to bus 405 and may store information and instructions that may be executed by processor 410. Main memory 420 may also be used to store temporary variables or other intermediate information during execution of instructions by processor 410.

Computing system 400 may also include read only memory (ROM) and/or other storage device 430 coupled to bus 405 that may store static information and instructions for processor 410. Date storage device 440 may be coupled to bus 405 to store information and instructions. Date storage device 440, such as magnetic disk or optical disc and corresponding drive may be coupled to computing system 400.

Computing system 400 may also be coupled via bus 405 to display device 450, such as a cathode ray tube (CRT), liquid crystal display (LCD) or Organic Light Emitting Diode (OLED) array, to display information to a user. User input device 460, including alphanumeric and other keys, may be coupled to bus 405 to communicate information and command selections to processor 410. Another type of user input device 460 is cursor control 470, such as a mouse, a trackball, a touchscreen, a touchpad, or cursor direction keys to communicate direction information and command selections to processor 410 and to control cursor movement on display 450. Camera and microphone arrays 490 of computer system 400 may be coupled to bus 405 to observe gestures, record audio and video and to receive and transmit visual and audio commands.

Computing system 400 may further include network interface(s) 480 to provide access to a network, such as a local area network (LAN), a wide area network (WAN), a metropolitan area network (MAN), a personal area network (PAN), Bluetooth, a cloud network, a mobile network (e.g., 3rd Generation (3G), etc.), an intranet, the Internet, etc. Network interface(s) 480 may include, for example, a wireless network interface having antenna 485, which may represent one or more antenna(e). Network interface(s) 480 may also include, for example, a wired network interface to communicate with remote devices via network cable 487, which may be, for example, an Ethernet cable, a coaxial cable, a fiber optic cable, a serial cable, or a parallel cable.

Network interface(s) 480 may provide access to a LAN, for example, by conforming to IEEE 802.11b and/or IEEE 802.11g standards, and/or the wireless network interface may provide access to a personal area network, for example, by conforming to Bluetooth standards. Other wireless network interfaces and/or protocols, including previous and subsequent versions of the standards, may also be supported.

In addition to, or instead of, communication via the wireless LAN standards, network interface(s) 480 may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

Network interface(s) 480 may include one or more communication interfaces, such as a modem, a network interface card, or other well-known interface devices, such as those used for coupling to the Ethernet, token ring, or other types of physical wired or wireless attachments for purposes of providing a communication link to support a LAN or a WAN, for example. In this manner, the computer system may also be coupled to a number of peripheral devices, clients, control surfaces, consoles, or servers via a conventional network infrastructure, including an Intranet or the Internet, for example.

It is to be appreciated that a lesser or more equipped system than the example described above may be preferred for certain implementations. Therefore, the configuration of computing system 400 may vary from implementation to implementation depending upon numerous factors, such as price constraints, performance requirements, technological improvements, or other circumstances. Examples of the electronic device or computer system 400 may include without limitation a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The following clauses and/or examples pertain to further embodiments or examples. Specifics in the examples may be used anywhere in one or more embodiments. The various features of the different embodiments or examples may be variously combined with some features included and others excluded to suit a variety of different applications. Some embodiments pertain to a method comprising: detecting context-aware data relating to a computing device and a user associated with the computing device; monitoring available space at a local storage of the computing device; and dynamically allocating portions of the space at the local storage based on the context-aware data and results of the monitoring of the space, wherein the dynamic allocation includes providing a first portion of the space to a first content by moving a second content from the local storage to one or more remote storage devices.

Embodiments or examples include any of the above methods determining one or more contexts based on the detected context-aware data; and evaluating the one or more contexts of the detected context-aware data, user-provided contexts, and changing activities of the computing device or the user; and predicting usage behavior of the first computing device based on the evaluation, and wherein the dynamic allocation is further based on the predicted usage behavior.

Embodiments or examples include any of the above methods wherein the one or more remote storage devices comprise a cloud-based remote storage device coupled to a server computing device, wherein the second content is moved to the cloud-based remote storage device over a network including a cloud network, and wherein the one or more remote storage devices comprise a device-based remote storage device coupled to a client computing device, wherein the second content is moved to the device-based remote storage device over a proximity network including a Bluetooth connection Embodiments or examples include any of the above methods further comprising resolving a conflict between the first content and the second content based on a default conflict resolution policy or a user-provided conflict resolution policy, wherein the user-provided conflict resolution policy maintains priority over the default conflict resolution policy, wherein the first and second contents comprise one or more of software applications, photographs, videos, text files, music files, and one or more data files needing storage.

Some embodiments pertain to a method comprising: receiving, at a server computing device, a request for moving content from a local storage of a client computing device to a remote cloud storage device coupled to the server computing device; reviewing context-aware data relating to the client computing device; and storing the content at the remote cloud storage device based on the context-aware data.

Embodiments or examples include any of the above methods further comprising extracting the context-aware data relating to the client computing device prior to providing the context-aware data to the context-aware data management logic.

Embodiments or examples include any of the above methods further comprising: communicating, over a network, a notification relating to the content being stored at the remote cloud storage to the client computing device, wherein the network includes a cloud network; and retrieving, in response to a retrieval request, the content from the remote cloud storage device, wherein the retrieved content is communicated back to the local storage at the client computing device.

Another embodiment or example includes an apparatus to carry out operations according to any of the methods mentioned above.

In another embodiment or example, an apparatus comprises means for carrying out operations according to any of the methods mentioned above.

In yet another embodiment or example, a computing device arranged to carry out operations according to any of the methods mentioned above.

In one embodiment or example, a system comprises a mechanism to carry out operations according to any of the methods mentioned above.

In yet another embodiment or example, at least one machine-readable storage medium comprising a plurality of instructions that in response to being executed on a computing device, causes the computing device to carry out operations according to any of the methods mentioned above.

In yet another embodiment or example, at least one non-transitory or tangible machine-readable storage medium comprising a plurality of instructions that in response to being executed on a computing device, causes the computing device to carry out operations according to any of the methods mentioned above.

Some embodiments pertain to an apparatus comprising: context-aware detection and management logic to detect context-aware data relating to a computing device and a user associated with the computing device; and storage allocation logic to monitor available space at a local storage of the computing device, wherein the storage allocation logic is further to dynamically allocate portions of the space at the local storage based on the context-aware data and results of the monitoring of the space, wherein the dynamic allocation includes providing a first portion of the space to a first content by moving a second content from the local storage to one or more remote storage devices.

Embodiments or examples include the above apparatus further comprising predictability logic to evaluate one or more of the detected context-aware data, user-provided contexts, and changing activities of the computing device or the user, wherein the predictability logic is further to predict future usage behavior of the first computing device based on the evaluation.

Embodiments or examples include the above apparatus wherein the dynamic allocation is further based on the predicted usage behavior.

Embodiments or examples include the above apparatus wherein the one or more remote storage devices comprise a cloud-based remote storage device coupled to a server computing device, wherein the second content is moved to the cloud-based remote storage device over a network including a cloud network.

Embodiments or examples include the above apparatus wherein the one or more remote storage devices comprise a device-based remote storage device coupled to the apparatus, wherein the second content is moved to the device-based remote storage device over a proximity network including a Bluetooth connection.

Embodiments or examples include the above apparatus further comprising conflict resolution logic to resolve a conflict between the first content and the second content based on a default conflict resolution policy or a user-provided conflict resolution policy, wherein the user-provided conflict resolution policy maintains priority over the default conflict resolution policy.

Embodiments or examples include the above apparatus wherein the first and second contents comprise one or more of software applications, photographs, videos, text files, music files, and one or more data files needing storage.

Some embodiments pertain to an apparatus comprising: reception/authentication logic to receive, at the apparatus, a request for moving content from a local storage of a client computing device to a remote cloud storage device coupled to the server computing device; context-aware data management logic to review context-aware data relating to the client computing device; and remote storage logic to store the content at the remote cloud storage device based on the context-aware data.

Embodiments or examples include the above apparatus further comprising device/context management logic to extract the context-aware data relating to the client computing device prior to providing the context-aware data to the context-aware data management logic.

Embodiments or examples include the above apparatus further comprising communication/compatibility logic to communicate, over a network, a notification relating to the content being stored at the remote cloud storage or the local storage to the client computing device, wherein the network includes a cloud network.

Embodiments or examples include the above apparatus wherein the remote storage logic is further to retrieve, in response to a retrieval request, based on usage and predictability, the content from the remote cloud storage device, wherein the retrieved content is communicated back to the local storage at the client computing device.

Some embodiments pertain to a system comprising: a computing device having a memory to store instructions, and a processing device to execute the instructions, the computing device further having a mechanism to perform one or more operations comprising: detecting context-aware data relating to a computing device and a user associated with the computing device; monitoring available space at a local storage of the computing device; and dynamically allocating portions of the space at the local storage based on the context-aware data and results of the monitoring of the space, wherein the dynamic allocation includes providing a first portion of the space to a first content by moving a second content from the local storage to one or more remote storage devices.

Embodiments or examples include the above system wherein the one or more operations further comprise evaluating one or more of the detected context-aware data, user-provided contexts, and changing activities of the computing device or the user; and predicting usage behavior of the first computing device based on the evaluation.

Embodiments or examples include the above system wherein the dynamic allocation is further based on the predicted usage behavior.

Embodiments or examples include the above system wherein the one or more remote storage devices comprise a cloud-based remote storage device coupled to a server computing device, wherein the second content is moved to the cloud-based remote storage device over a network including a cloud network.

Embodiments or examples include the above system wherein the one or more remote storage devices comprise a device-based remote storage device coupled to a client computing device, wherein the second content is moved to the device-based remote storage device over a proximity network including a Bluetooth connection.

Embodiments or examples include the above system wherein the one or more operations further comprise resolving a conflict between the first content and the second content based on a default conflict resolution policy or a user-provided conflict resolution policy, wherein the user-provided conflict resolution policy maintains priority over the default conflict resolution policy.

Embodiments or examples include the above system wherein the first and second contents comprise one or more of software applications, photographs, videos, text files, music files, and one or more data files needing storage.

Some embodiments pertain to a system comprising: a computing device having a memory to store instructions, and a processing device to execute the instructions, the computing device further having a mechanism to perform one or more operations comprising: receiving, at a server computing device, a request for moving content from a local storage of a client computing device to a remote cloud storage device coupled to the server computing device; reviewing context-aware data relating to the client computing device; and storing the content at the remote cloud storage device based on the context-aware data.

Embodiments or examples include the above system wherein the one or more operations further comprise extracting the context-aware data relating to the client computing device prior to providing the context-aware data to the context-aware data management logic.

Embodiments or examples include the above system wherein the one or more operations further comprise communicating, over a network, a notification relating to the content being stored at the remote cloud storage to the client computing device, wherein the network includes a cloud network.

Embodiments or examples include the above system wherein the one or more operations further comprise retrieving, in response to a retrieval request, the content from the remote cloud storage device, wherein the retrieved content is communicated back to the local storage at the client computing device.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
at least one memory;
instructions; and
at least one processor to execute the instructions to:
  detect context-aware data relating to a user associated with a computing device;
  evaluate the context-aware data related to the user, the context-aware data including at least one of user-provided contexts or changing activities associated with the user;
  predict future usage behavior of the computing device based on the evaluation;
  monitor available local space at a local storage of the computing device and remote space at one or more remote storage devices;
  store user-provided priorities in the local storage, the user-provided priorities to associate first content with a first priority;
  in response to a determination that the available local space is insufficient when there is a conflict between the first priority of the first content and a second priority of second content, automatically assign a third priority to the second content based on the second content being associated with at least one of a hospital emergency service, a police emergency service, or a fire emergency service, the third priority higher than the first priority of the first content and the second priority of the second content;
  allocate one or more portions of the local and remote spaces at a first time based on the predicted future usage behavior to store the second content at a first portion of the local space, the first portion available to store the second content by moving third content from the first portion of the local storage to the one or more remote storage devices; and delete the second content from the first portion of the local space at a second time, the second time derived from the context-aware data.

2. The apparatus of claim 1, wherein the one or more remote storage devices include a cloud-based remote storage device coupled to a server computing device, the third content moved to the cloud-based remote storage device over a network including a cloud network.

3. The apparatus of claim 1, wherein the one or more remote storage devices include a device-based remote storage device coupled to the computing device, the third content moved to the device-based remote storage device over a proximity network including a Bluetooth connection.

4. The apparatus of claim 1, wherein the second content includes at least one of a software application, a photograph, a video, a text file, an audio file, or a data file.

5. The apparatus of claim 1, wherein the processor is to execute the instructions to provide a key to a host machine to authenticate the computing device.

6. The apparatus of claim 1, wherein to predict the future usage behavior of the computing device, the processor is to execute the instructions to predict a loss of connection to a network.

7. The apparatus of claim 1, wherein the changing of the activities is representative of a change in proximity between the computing device and at least one of the one or more remote storage devices.

8. A method comprising:
   detecting context-aware data relating to a user associated with a computing device;
   evaluating the context-aware data related to the user, the context-aware data including at least one of user-provided contexts or changing activities associated with the user;
   predicting future usage behavior of the computing device based on the evaluation;
   monitoring available local space at a local storage of the computing device and remote space at one or more remote storage devices;
   storing user-provided priorities in the local storage, the user-provided priorities to associate first content with a first priority;
   in response to a determination that the available local space is insufficient when there is a conflict between the first priority of the first content and a second priority of second content, automatically assigning a third priority to the second content based on the second content being associated with at least one of a hospital emergency service, a police emergency service, or a fire emergency service, the third priority higher than the first priority of the first content and the second priority of the second content;
   allocating one or more portions of the local and remote spaces at a first time based on the predicted future usage behavior to store the second content at a first portion of the local space, the first portion available to store the second content by moving third content from the first portion of the local storage to the one or more remote storage devices; and
   deleting the second content from the first portion of the local space at a second time, the second time derived from the context-aware data.

9. The method of claim 8, wherein the one or more remote storage devices include a cloud-based remote storage device coupled to a server computing device, the third content moved to the cloud-based remote storage device over a network including a cloud network.

10. The method of claim 8, wherein the one or more remote storage devices include a device-based remote storage device coupled to the computing device, the third content moved to the device-based remote storage device over a proximity network including a Bluetooth connection.

11. The method of claim 8, wherein the second content includes at least one of a software application, a photograph, a video, a text file, an audio file, or a data file.

12. The method of claim 8, further including sending a key to a host machine to authenticate the computing device.

13. The method of claim 8, wherein the predicting of the future usage behavior of the computing device includes predicting a loss of connection to a network.

14. At least one non-transitory machine-readable medium comprising a plurality of instructions that in response to being executed on a computing device, causes the computing device to at least:
   detect context-aware data relating to a user associated with the computing device;
   evaluate the context-aware data related to the user, the context-aware data including at least one of user-provided contexts or changing activities associated with the user;
   predict future usage behavior of the computing device based on the evaluation; and
   monitor available local space at a local storage of the computing device and remote space at one or more remote storage devices;
   a store user-provided priorities in the local storage, the user-provided priorities to associate first content with a first priority;
   in response to a determination that the available local space is insufficient when there is a conflict between the first priority of the first content and a second priority of second content, automatically assign a third priority to the second content based on the second content being associated with at least one of a hospital emergency service, a police emergency service, or a fire emergency service, the third priority higher than the first priority of the first content and the second priority of the second content;
   allocate one or more portions of the local and remote spaces at a first time based on the predicted future usage behavior to store the second content at a first portion of the local space, the first portion available to store the second content by moving third content from the first portion of the local storage to the one or more remote storage devices; and
   delete the second content from the first portion of the local space at a second time, the second time derived from the context-aware data.

15. The non-transitory machine-readable medium of claim 14, wherein the one or more remote storage devices include a cloud-based remote storage device coupled to a server computing device, the third content moved to the cloud-based remote storage device over a network including a cloud network.

16. The non-transitory machine-readable medium of claim 14, wherein the one or more remote storage devices include a device-based remote storage device coupled to the computing device, the third content moved to the device-based remote storage device over a proximity network including a Bluetooth connection.

17. The non-transitory machine-readable medium of claim 14, wherein the second content includes at least one of a software application, a photograph, a video, a text file, an audio file, or a data file.

18. The non-transitory machine-readable medium of claim 14, wherein the instructions, when executed, cause the computing device to send a key to a host machine to authenticate the computing device.

19. The non-transitory machine-readable medium of claim 14, wherein the instructions, when executed, cause the computing device to predict the future usage behavior of the computing device by predicting a loss of connection to a network.

20. The non-transitory machine-readable medium of claim 14, wherein the changing of the activities is representative of a change in proximity between the computing device and at least one of the one or more remote storage devices.

* * * * *